(12) United States Patent
Ganeshan

(10) Patent No.: US 6,548,033 B2
(45) Date of Patent: Apr. 15, 2003

(54) SPARE SELECTIVE CATALYTIC REDUCTION REACTOR SYSTEM

(75) Inventor: Ram Ganeshan, Sugar Land, TX (US)

(73) Assignee: Technology Sales & Marketing Corporation, Sugar Land, TX (US)

( * ) Notice: Subject to any disclaimer, the term of this patent is extended or adjusted under 35 U.S.C. 154(b) by 127 days.

(21) Appl. No.: 09/681,271

(22) Filed: Mar. 12, 2001

(65) Prior Publication Data

US 2002/0127153 A1 Sep. 12, 2002

(51) Int. Cl.⁷ .............................................. B01D 53/56
(52) U.S. Cl. ..................... 423/239.1; 422/172; 422/177; 422/190; 422/211; 110/345
(58) Field of Search .............................. 423/235, 239.1; 422/172, 177, 190, 211; 110/203, 345; 60/653, 676

(56) References Cited

U.S. PATENT DOCUMENTS

| | | | |
|---|---|---|---|
| 2,349,574 A | 5/1944 | Conn | 208/152 |
| 2,426,869 A | 9/1947 | Hamilton et al. | 208/78 |
| 2,436,340 A | 2/1948 | Upham et al. | 208/148 |
| 2,614,068 A | 10/1952 | Healy et al. | 208/78 |
| 2,804,426 A | 8/1957 | Askey | 208/136 |
| 3,470,090 A | 9/1969 | Carson | 208/138 |
| 5,943,865 A | * 8/1999 | Cohen | 60/653 |
| 5,988,115 A | * 11/1999 | Anderson et al. | 122/4 D |

* cited by examiner

Primary Examiner—Stanley S. Silverman
Assistant Examiner—Maribel Medina
(74) Attorney, Agent, or Firm—Daniel N. Lundeen; Lundeen & Dickinson, LLP

(57) ABSTRACT

A system of selective catalytic reduction units for reducing nitrogen oxides by operating a plurality of parallel combustion units in parallel with a spare selective catalytic reduction reactor is disclosed. A primary selective catalytic reactor with spent catalyst is isolated for maintenance while the flue gas is diverted to the spare selective catalytic reduction reactor while continuing to discharge flue gas essentially free of nitrogen oxides from the spare selective catalytic reduction reactor. The spare selective catalytic reduction reactor can include a spare induced draft fan to provide an alternate means for operation and maintenance.

13 Claims, 2 Drawing Sheets

CONCEPT: 3 SCR SYSTEMS SHARING ONE SCR AND ONE IDFAN AS STAND-BY

SPARE SELECTIVE CATALYTIC REDUCTION REACTOR SYSTEM

BACKGROUND OF INVENTION

The present invention is directed to the continuous operation of a plurality of combustion units using a selective catalytic reduction (SCR) system that reduces $NO_x$ in the flue gases, and more particularly to a system wherein a spare SCR reactor is installed in parallel with the primary SCR units so that the spare unit can be utilized while any one or more of the primary SCR units are placed out of service for maintenance.

Selective catalytic reduction (SCR) reactors convert nitrogen oxides ($NO_x$), present in flue gases from combustion sources, into a harmless by-product of nitrogen and water. A single SCR reactor is commonly installed for each combustion source for the reduction of $NO_x$. Such combustion sources include but are not limited to refinery heaters, industrial furnaces or boilers.

The performance of an SCR unit is limited by the effectiveness of the catalyst placed within the reactor. Unfortunately, the effectiveness of the catalyst diminishes over time due to catalyst inactivation from sulfur gases and/or other impurities in the exhaust gases. Catalyst suppliers are reluctant to guarantee that a catalyst will last more than 3 or 4 years, even if operating at ideal conditions. Ideal conditions for optimal performance of the catalyst include: 1) operating the catalyst within its specified temperature range; 2) utilizing combustion products with low sulfur compounds such as $SO_2$ and $SO_3$; and 3) no particulate matter present in the exhaust gases. These ideal conditions are difficult, if not impossible, to meet in industrial installations, chemical plants and petroleum refineries. Since these ideal conditions are not met, the life of the catalyst will be cut short and thus require replacement more often than every three or four years. To replace the catalyst, the industrial plants must shut down the facility or exceed desirable $NO_x$ emission levels. Either alternative can be costly to the plant in terms of both time and money.

Conventionally, each heater will have its own ducting, SCR unit, fan, emission monitoring system, and stack. Under this arrangement, the probability of catalyst failure to occur within four years is high, thus resulting in an unnecessary shutdown of the plant. Such shutdowns often result in a delay of 2 to 3 days before the plant can resume its normal operations. A single shutdown can burden operations with millions of dollars worth of lost opportunity.

To extend the operational life of the SCR unit and attempt to avoid the unnecessary delays, plant designers have simply added additional catalyst to the SCR unit. The increased amount is usually 25% or more of catalyst to the unit for every extra year of life needed for the unit. This technique is not desirable because the additional catalyst burdens other aspects of the operation, such as: 1) the size of the fan, 2) the size of the SCR reactor, and 3) the additional cost of the catalyst. Adding the additional catalyst to the reactor results in an increase in the pressure drop of the flue gases. In order to maintain a constant pressure of flue gas, the plant operator is required to install a larger fan. Also, a larger reactor is required to handle the increased volume of catalyst. The addition of larger fans and larger reactors generally results in higher capital costs.

Another prior art approach has been to replace all of the catalyst in all of the associated heaters in the section of the plant when one of the heaters has catalyst inactivity. This logic is based on the fact that if one SCR unit has stopped performing, then it is likely the other units are near the end of the useful catalyst life, and the operators do not want to experience another plant shutdown within a few months due to problems with the SCR of a different heater. This replacement technique is inefficient because the catalyst discarded from the functioning SCR units can have substantial remaining viability.

The present spare SCR invention provides a solution that allows industrial plants to continuously operate and replace the spent catalyst in an SCR unit, while simultaneously reducing the need to obtain government waivers for exceeding allowable $NO_x$ emissions.

SUMMARY OF INVENTION

The present invention is directed toward the continuous operation of an industrial selective catalytic reduction (SCR) system. The present invention allows for the replacement of catalyst within an SCR reactor while not disrupting the operations of a heater or other combustion process.

The spare SCR unit is operated by diverting gases from one combustion unit into the spare SCR unit with the use of dampers in the diversion ducts and the insertion of isolation blind plates at appropriate locations. The spare SCR can utilize the fan, the ammonia distribution system, and the emissions monitoring system of the existing combustion unit. The gas is then re-introduced into the same stack. An alternate embodiment eliminates the return ducting and dampers but requires an additional fan, an emissions monitoring system and stack for the spare SCR unit.

Once installed, the spare SCR system can be operated in a variety of ways to solve different problems that may arise in an industrial setting. For instance, when one of the main SCR units loses catalytic activity and $NO_x$ emissions rise to an unacceptable level, the spare SCR unit can be operated without shutting down the heater, until the main SCR is serviced for catalyst or fan replacement. Additionally, where one heater in the SCR system is performing below the environmental requirements, or where another heater in the plant is performing poorly, the spare SCR can work in conjunction with the poor-performing SCR thereby meeting the environmental requirements until such time as the heater can be shut down to change the catalyst.

The spare SCR can also remain empty while the need for the unit remains low. This allows plant operators with the means to regulate the amount of catalyst stored as on-site inventory, for example, where there are a number of spare SCR units installed at the plant site, each installed spare serving as a spare for a plurality of on-line SCR units.

DETAILED DESCRIPTION

Broadly, the invention provides continuous operations of a heater or other combustion unit when the catalyst is spent by installing one spare SCR reactor in parallel as a common unit to serve several parallel SCR units. Thus, the spare unit can be operated while any one or more of the SCR units are having problems operating.

Figure 1:
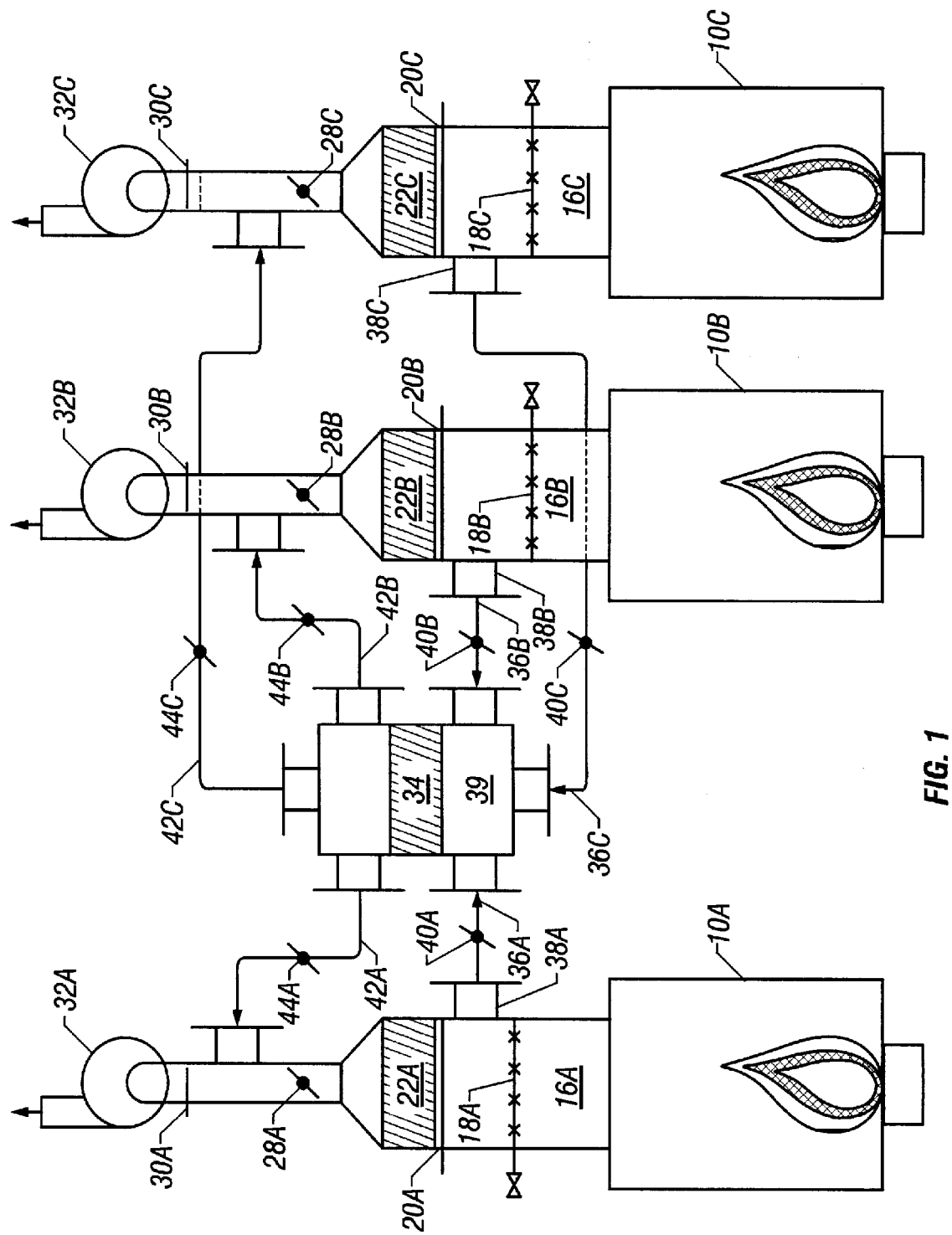
FIG. 1 is a simplified schematic of one embodiment of a continuous selective catalytic reduction system with return ducting to each fan and stack.

In accordance with one embodiment of the invention illustrated schematically in FIG. 1 with three heaters 10A, 10B, and 10C, which are approximately the same size. The system could also be used with 2 combustion sources or 4, 5, 6, 7, or 8 or more combustion sources, but three are illustrated for exemplary purposes only. The flue gas quantities and temperatures from all three are generally assumed to be within similarly narrow operating ranges. A properly functioning heating system conventionally allows for the exhaust gases to pass through a respective convection section 16A, 16B and 16C, then through an ammonia injection grid 18A, 18B and 18C, then up through an isolation blind plate 20A, 20B and 20C, into an SCR unit 22A, 22B and 22C, past a stack damper 28A, 28B and 28C, then past an emission sampling system 30A, 30B and 30C, and finally through a fan 32A, 32B and 32C, in a manner well known in the art. The stack damper 28A, 28B and 28C is preferably located between the respective SCR 22A 22B and 22C and the emissions sampling system 30A, 3OB and 30C, and is normally open during operation of the primary SCR.

The ammonia injection grids 18A, 18B and 18C conventionally distribute ammonia evenly into the flue gas. As is known in the art, the injected ammonia reacts with the $NO_x$ in the SCR reactors 22A, 228, and 22C and converts the compound into nitrogen and water. The SCR reactors 22A, 22B, and 22C are conventionally filled with catalyst that can be either high temperature catalyst, low temperature catalyst or moderate temperature catalyst, with a corresponding level of cooling of the flue gas achieved in the convection section 16A, 16B, and 16C.

The present invention includes the installation of a spare SCR unit 34 of appropriate size in parallel to the other main SCRs 22A, 228 and 22C. The spare SCR unit 34 is preferably located at the same height as the primary units and in reasonably close proximity to minimize the amount of ducting between units. Where one or more of the SCR units 22A, 22B and 22C is larger than the other(s), the SCR 34 is preferably essentially the same size as the largest SCR 22A, 22B and 22C. If there is an appreciable amount of ducting between the spare SCR unit 34 and the primary units 22A, 22B and 22C, then the fans 32A, 32B and 32C may need to be slightly oversized to handle any additional pressure drop. Alternatively, the SCR 34 only needs to be sized sufficiently to function for a short term as a replacement or stand-by for the largest SCR unit 22A, 22B and 22C for the period of time necessary to service the primary SCR unit 22A, 22B and 22C in need thereof, and could thus be substantially smaller. The spare SCR unit 34 can be installed at the same time as the primary SCR 22A, 22B and 22C are installed, or it can be installed as a retrofit application.

A respective bypass supply duct 36A, 36B, and 36C is installed from each tee 38A, 38B, and 38C disposed between ammonia injection grid 18A, 18B, and 18C and isolation blind plate 20A, 20B, and 20C. Each bypass duct 36A, 36B, and 36C is in fluid communication with the spare SCR 34, for example, by means of an inlet manifold 39. The use of such a manifold 39 can be beneficial in diverting a portion of the flue gas from an underperforming SCR unit 22A, 22B, and 22C to one or both of the remaining units. For example, if unit 22A is not performing adequately, a portion of the flue gas can be diverted to SCR units 22B and/or 22C by reducing the speed of the fan 32A and increasing the speed of the fans 32B and/or 32C.

A damper 40A, 40B, and 4OC is installed in each respective bypass pipe 36A 36B, and 36C between the tee 20A, 20B, and 20C and the manifold 39 for isolating flow to the spare SCR unit 34. An exit manifold 41 and respective return ducts 42A, 42B, and 42C allow for the treated exhaust to be reintroduced into the original heating system above the respective stack damper 28A, 28B, and 28C but upstream from the emissions sampling system 30A, 30B, and 30C and the fan. A damper 44A, 44B, and 44C is installed in each respective return duct 42A, 42B, and 42C for isolating the spare SCR unit 34.

An example of the operation of the system occurs according to the following scenario. Assume that the primary SCR 22A begins to develop an operating problem, such as, for example, its catalyst has lost activity and is not sufficiently reducing $NO_x$ to required levels so that excessive $NO_x$ bleeds through the SCR 22A, and the catalyst needs to be replaced. The plant operator diverts the exhaust gases into the spare SCR unit 34 by initially opening dampers 40A and 44A leaving dampers 40B, 40C, 44B and 44C closed. Next, the plant operator closes the stack damper 28A and inserts the isolation blind plate 20A. The catalyst in the main SCR unit 22A should be allowed to cool, and then the plant operator may then replace the spent catalyst with new catalyst using conventional catalyst replacement methodology and equipment. During this entire procedure, heaters 10A, 10B, and 10C can continue to operate. It should be noted that during the replacement of the catalyst the tee 38A and the ducting downstream from the damper 28A are under negative pressure minimizing the risk to maintenance personnel from exposure to hot gases. Once the new catalyst is introduced, the operator can bring SCR unit 22A back on line by opening the stack damper 28A and withdrawing the isolation blind plate 20A, followed by closing the dampers 40A and 44A.

Figure 2:
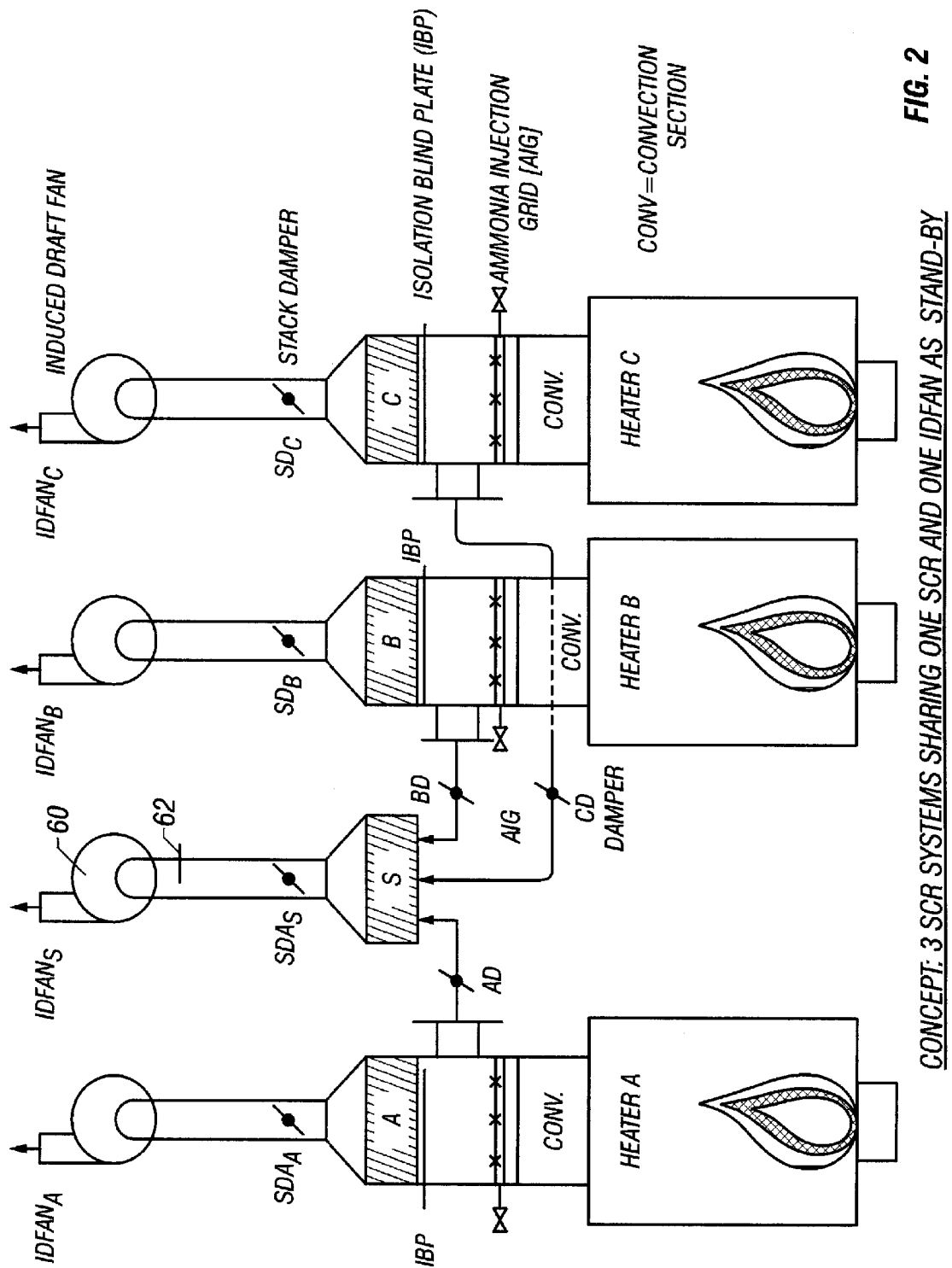
FIG. 2 is a simplified schematic of an alternative embodiment of a continuous selective catalytic reduction system wherein the spare SCR unit has its own fan and stack.

An alternate embodiment of the system is disclosed in FIG. 2. The alternate embodiment provides a fan 60 and emission sampling system 62 associated with the spare SCR unit 34, and eliminates the return ducting 42A, 42B, and 42C of the FIG. 1 embodiment. This has the advantage of eliminating ducting and dampers, but the added expense of the additional fan, emission sampling system, fan and stack. This system allows the operation of the spare SCR unit 34 for repair or replacement of a fan 32A, 32B, and 32C or other equipment, and can be particularly advantageous where the ductwork is difficult to install or the amount of ductwork is cost prohibitive. Therefore, having a dedicated spare fan 60 on the spare SCR 34 makes the system considerably more reliable and provides for longer operation between heater shutdowns.

What is claimed is:

1. A system of selective catalytic reduction units for reducing nitrogen oxides, comprising:

a plurality of parallel combustion units producing $NO_x$-containing flue gases that are passed serially in respective primary ducting from each respective combustion unit through a respective ammonia injection grid, primary selective catalytic reduction reactor, and primary fan;

a spare selective catalytic reduction reactor ducted via secondary ducting in parallel with the primary selective catalytic reduction reactor for receiving flue gas diverted from one of the said primary selective catalytic reduction reactors while the said selective catalytic reduction reactor is out of service for maintenance;

selectively operable flow diverters in the primary and secondary ducting for selectively isolating the primary and spare selective catalytic reduction reactors.

2. The system of claim 1 wherein an inlet to a tee of the secondary ducting into the primary ducting downstream from the ammonia injection grid and upstream from the primary selective catalytic reduction reactor, and the flow diverters are positioned in the primary ducting between the tee and the primary selective catalytic reduction reactor and in the secondary ducting between the tee and the spare selective catalytic reduction reactor.

3. The system of claim 1 wherein an outlet from a tee of the secondary ducting the primary ducting downstream from the primary selective catalytic reduction reactor and upstream from the fan, and the flow diverters are positioned in the primary ducting between the tee and the primary selective catalytic reduction reactor and in the secondary ducting between the tee and the spare selective catalytic reduction reactor.

4. The system of claim 1 comprising a spare induced draft fan ducted to receive flue gas from the spare selective catalytic reduction reactor and discharge the flue gas essentially free of nitrogen oxides to the atmosphere.

5. The system of claim 4 comprising a spare emission sampling system operatively disposed downstream from the spare selective catalytic reduction reactor.

6. A method for continuously operating a plurality of parallel combustion units producing $NO_x$-containing flue gases that are passed serially in respective primary ducting from each respective combustion unit through a respective ammonia injection grid, primary selective catalytic reduction reactor, and induced draft fan, comprising:

installing a spare selective catalytic reduction reactor ducted via secondary ducting in parallel with the primary selective catalytic reduction reactor for receiving flue gas diverted from one of the said primary selective catalytic reduction reactors while the said selective catalytic reduction reactor is out of service for maintenance;

selectively operating flow diverters in the primary and secondary ducting for selectively isolating one of said primary selective catalytic reduction reactors out of service for maintenance and diverting flue gas from the out-of-service primary selective catalytic reduction reactor to the spare selective catalytic reduction reactor.

7. The method of claim 6 comprising selectively operating flow diverters in the primary and secondary ducting to return flue gas from the spare selective catalytic reduction reactor to the primary ducting downstream from the isolated out-of-service primary selective catalytic reduction reactor and upstream from the respective induced draft fan.

8. The method of claim 6 comprising discharging flue gas essentially free of nitrogen oxides from the spare selective catalytic reduction reactor into a suction of a spare induced draft fan, wherein the operation of the flow diverters isolates the induced draft fan associated with the out-of-service primary selective catalytic reduction reactor.

9. The method of claim 6 further comprising replacing catalyst in the out-of-service primary selective catalytic reduction reactor and thereafter selectively operating the flow diverters to return the said primary selective catalytic reduction reactor to service and isolate the spare selective catalytic reduction reactor.

10. The method of claim 9 further comprising servicing the induced draft fan associated with the out-of-service primary selective catalytic reduction reactor prior to returning the out-of-service primary selective catalytic reduction reactor to service.

11. The method of claim 6 wherein the selective operation of the flow diverters comprises first opening a damper in secondary ducting from the primary ducting to the spare selective catalytic reduction reactor and then placing an isolation blind plate in the primary ducting upstream from the primary selective catalytic reduction reactor.

12. The method of claim 11 wherein the flue gas is diverted to the secondary ducting downstream from the ammonia injection grid.

13. A system of selective catalytic reduction units for reducing nitrogen oxides, comprising:

a plurality of parallel combustion units producing $NO_x$-containing flue gases that are passed serially in respective primary ducting from each respective combustion unit through a respective ammonia injection grid, primary selective catalytic reduction reactor, and induced draft fan;

a spare selective catalytic reduction reactor ducted via secondary ducting in parallel with the primary selective catalytic reduction reactor for receiving flue gas diverted from one of the said primary selective catalytic reduction reactors while the said selective catalytic reduction reactor is out of service for maintenance;

means for selectively isolating one of said primary selective catalytic reduction reactors out of service for maintenance and diverting flue gas from the out-of-service primary selective catalytic reduction reactor to the spare selective catalytic reduction reactor.

* * * * *